United States Patent [19]

Taylor

[11] Patent Number: 5,421,732

[45] Date of Patent: Jun. 6, 1995

[54] APPARATUS AND METHOD FOR TEACHING ADDITION AND SUBTRACTION

[76] Inventor: Raymond R. Taylor, 2840 Lera Jones Dr., Antioch, Tenn. 37138

[21] Appl. No.: 276,410

[22] Filed: Jul. 18, 1994

[51] Int. Cl.6 .......................... G09B 1/06; G09B 19/02
[52] U.S. Cl. ..................................... 434/195; 434/200
[58] Field of Search ............... 434/191, 195, 196, 200, 434/205, 208

[56] References Cited

U.S. PATENT DOCUMENTS

| | | | |
|---|---|---|---|
| 2,899,757 | 8/1959 | Webb | 434/195 X |
| 3,094,792 | 6/1963 | Morgan et al. | 434/195 |
| 3,229,388 | 1/1966 | Smith | 434/195 |
| 3,597,854 | 8/1971 | Trimmer | 434/200 |
| 3,672,072 | 6/1972 | Akiyama | 434/203 |
| 3,690,018 | 9/1972 | Arroyo | 434/200 |
| 3,708,892 | 1/1973 | Graf | 434/204 |
| 3,758,962 | 9/1973 | Bagdasar | 434/205 |
| 3,768,177 | 10/1973 | Thomas | 434/192 X |
| 3,924,859 | 12/1975 | Kramer | 434/191 X |
| 3,935,649 | 2/1976 | Harte | 434/195 |
| 4,014,547 | 3/1977 | Gomez et al. | 273/134 C |
| 4,029,320 | 6/1977 | Hausman | 273/134 AD |
| 4,061,337 | 12/1977 | Callender | 273/134 AT |
| 4,078,318 | 3/1978 | Shivers | 434/208 |
| 4,114,290 | 9/1978 | Cooper | 434/200 |
| 4,173,834 | 11/1979 | Arzola | 434/209 |
| 4,177,581 | 12/1979 | Walker | 434/200 |
| 4,188,734 | 2/1980 | Rich | 434/200 X |
| 4,212,118 | 7/1980 | Baldwin et al. | 434/208 |
| 4,233,757 | 11/1980 | Narcise | 434/203 |
| 4,295,832 | 10/1981 | Karell | 434/190 X |
| 4,360,347 | 11/1982 | Ghaznavi | 434/208 X |
| 4,382,794 | 5/1983 | Preus | 434/195 X |
| 4,772,208 | 9/1988 | Tsokas | 434/195 X |
| 4,778,390 | 10/1988 | Marans | 434/196 X |
| 4,808,111 | 2/1989 | Pratt | 434/191 |
| 4,856,998 | 8/1989 | Silas | 434/199 X |
| 4,884,973 | 12/1989 | Pak | 434/191 |
| 4,927,158 | 5/1990 | Lierman | 434/200 X |
| 5,039,603 | 8/1991 | Pocius | 434/191 X |
| 5,076,793 | 12/1991 | Aghevli et al. | 434/196 |
| 5,083,793 | 1/1992 | Sanford | 434/191 X |
| 5,116,062 | 5/1992 | Johnson | 273/260 |
| 5,135,399 | 8/1992 | Ryan | 434/236 |
| 5,167,505 | 12/1992 | Walsh | 434/200 |

FOREIGN PATENT DOCUMENTS

529461 11/1940 United Kingdom ................ 434/200

*Primary Examiner*—William H. Grieb
*Attorney, Agent, or Firm*—Rick R. Wascher

[57] ABSTRACT

The present invention is directed to an apparatus and method for teaching addition and subtraction. The apparatus includes a game board, a plurality of movable dowels having predetermined lengths with spaced apart indicia marked thereon, and a number generator such as a pair of dice. The game board has a pair of spaced apart dowel receiving rows corresponding to "in play" and "out of play" positions. The rows may also include a plurality of pegs for supporting the dowels in a vertical position. In addition, optional segmented slots enable the player to lay the dowels vertically end to end on the game board without having them roll off of the board if the game is played on a surface which is not level. The separation distance between adjacent slot segments slots and the indicia associated with the dowels assist the player with the addition and subtraction computations. The game board also includes a plurality of dice receiving spaces and aligned with the slot segments. The method of the present invention is directed to the method of playing a game with the inventive apparatus.

20 Claims, 14 Drawing Sheets

APPARATUS AND METHOD FOR TEACHING ADDITION AND SUBTRACTION

BACKGROUND OF THE INVENTION

1. Field of the Invention

The present invention relates generally to games and teaching aids for teaching addition and subtraction, but more particularly to such games and teaching aids incorporating game boards and playing pieces.

2. Description of the Related Art

Teachers and many parents are confronted with the task of teaching addition and subtraction to children. Young children often regard learning exercises as a task devoid of fun, and as a result often lose interest in such exercises after a relatively short time. In addition, conventional teaching methods have been considered by some to be only marginally effective with young children because such methods often require the child to have the ability to readily manipulate the numbers being added or subtracted by their own thought processes. Conventional methods of teaching addition and subtraction, therefore, have limitations. The limitations include the age of the child and the familiarity of the child with numbers, the child's ability to understand the significance of each number in a counting sequence, and appreciate that each number is in itself a sum of the number one. Furthermore, when a child is very young his or her attention span may be limited with respect to learning tasks but be far greater with respect to games and the fun associated with playing games. The present invention seeks to add an element of fun, skill, strategic thought, and visual recognition to the task of teaching and learning addition and subtraction.

The prior art to which the invention relates includes several United States patents, including the following, all of which are incorporated by reference as if fully set forth herein:

| U.S. Pat. No. | Patentee |
| --- | --- |
| 5,167,505 | Walsh |
| 5,135,399 | Ryan |
| 5,116,062 | Johnson |
| 5,083,793 | Sanford |
| 5,076,793 | Aghevli et al. |
| 5,039,603 | Pocius |
| 4,927,158 | Lierman |
| 4,884,973 | Pak |
| 4,856,998 | Silas |
| 4,808,111 | Pratt |
| 4,778,390 | Marans |
| 4,772,208 | Tsokas |
| 4,382,794 | Preus |
| 4,360,347 | Ghaznavi |
| 4,295,832 | Karell |
| 4,233,757 | Narcise |
| 4,212,118 | Baldwin et al. |
| 4,188,734 | Rich |
| 4,177,581 | Walker |
| 4,173,834 | Arzola |
| 4,114,290 | Cooper |
| 4,078,318 | Shivers |
| 4,061,337 | Callender |
| 4,029,320 | Hausman |
| 4,014,547 | Gomez et al. |
| 3,935,649 | Harte |
| 3,924,859 | Kramer |
| 3,768,177 | Thomas |
| 3,758,962 | Bagdasar |
| 3,708,892 | Graf |
| 3,690,018 | Arroyo |
| 3,672,072 | Akiyama |

-continued

| U.S. Pat. No. | Patentee |
| --- | --- |
| 3,597,854 | Trimmer |

Prior to the date of the present invention, a mathematical game useful for teaching addition and subtraction and incorporating a plurality of movable dowels having predetermined heights and a game board configured for use with the dowels, has not been invented.

SUMMARY OF THE INVENTION

The present invention is directed to an apparatus and method for teaching addition and subtraction. The apparatus includes a game board, a plurality of movable dowels having predetermined lengths with spaced apart indicia marked thereon, and a number generator such as a pair of dice. The dowels may be of any suitable shape such as cylindrical, rectangular, etc. The lengths of the dowels comprise the length of at least one unit such that a first dowel is a single unit in length, a second dowel is two units in length, a third dowel is three units in length, etc. Thus, any particular dowel corresponds to a number N units.

The game board has a pair of spaced apart dowel receiving rows corresponding to "in play" and "out of play" positions. The rows may also include a plurality of pegs for supporting the dowels in a vertical position, and enabling them to be stacked vertically end to end. In addition, optional segmented slots enable the player to lay the dowels horizontally end to end on the game board without having them roll off of the board if the game is played on a surface which is not level.

The separation distance between adjacent slot segments slots and the indicia associated with the dowels assist the player with the addition and subtraction computations. The game board also includes a plurality of dice receiving spaces and aligned with the slot segments. The method of the present invention is directed to the method of playing a game with the inventive apparatus.

The present invention can also be summarized in a variety of ways, one of which is the following: a game for teaching addition and subtraction comprising a plurality of dowels having predetermined lengths comprised of at least one unit, wherein the length of any of the plurality of dowels can be determined by a number N corresponding to the sum of the number of units associated with a particular dowel of the plurality of dowels, a game board having a plurality of spaced apart rows capable of receiving any of the plurality of dowels in a vertical or a horizontal position, and number generating means for generating at least one number.

The plurality of rows may further comprise at least one row divided in incremental segments wherein each segment has a length corresponding to a single unit, or at least one row having spaced apart dowel receiving means for receiving any of the plurality of dowels and supporting them in a vertical position. The dowel receiving means may include at least one peg, and then at least one row divided in incremental segments may include indicia denoting a mathematical operation to be carried out in such row wherein the mathematical operation is addition or subtraction. The number generating means of the invention can be summarized in a a variety of ways. The number generating means may be a die, a spinner, a random selection of a number by the user, or any other suitable means of generating a number. Random selection by the user, for example, may comprise selecting a number thought of in the users mind and thus while the mind is typically not considered as a number generating means by most individuals, it is for purposes of the present invention.

The game board may further include indicia denoting the number of units N, and the at least one row includes a pair of spaced apart rows, or a slot for receiving any of the plurality of dowels in a horizontal position. Similarly, the plurality of dowels further includes numerical indicia corresponding to the number N of units comprising the length of a particular dowel.

The method of the present invention can be summarized in a variety of ways, one of which is the following: a method of teaching addition and subtraction, comprising the steps of positioning a plurality of dowels at a starting position of a game board, wherein the plurality of dowels have predetermined lengths comprised of a least one unit, wherein the length of any of the plurality of dowels can be determined by a number N corresponding to the sum of the number of units associated with a particular dowel of the plurality of dowels, generating a number N, and selecting at least one dowel corresponding to the number N and moving it from its starting position to a second position.

The step of generating a number may include the step of rolling a pair of dice and adding the result to obtain the number N. The step of selecting at least one dowel corresponding to the number N further may include selecting a plurality of dowels whose cumulative sum of units correspond to the number N and moving the dowels selected to a second position. Similarly, the step of selecting a plurality of dowels may include the step of aligning the dowels selected in an end to end fashion on the game board to verify if the cumulative sum of the units of the dowels selected correspond to the number N, or it may further include the step of aligning the dowels selected side by side in a parallel arrangement to verify if the difference between the number of units of the plurality of selected dowels corresponds to the number N. The alignment of dowels in an end to end fashion is done vertically upright or horizontally lying them down on the game board.

DETAILED DESCRIPTION OF THE PREFERRED EMBODIMENT(S)

The object of the inventive game is represented by the method of play with the inventive apparatus. The object is to move all of a players playing dowels off a first row or starting position to a second row or finishing position.

With respect to FIGS. 1-16, the inventive game designated generally by the reference numeral 20 and comprises a game board 22, a plurality of dowels 24 of varying heights corresponding to associated numerical values, and a pair of dice 26. The dowels may be of any suitable shape such as cylindrical (shown in the figures), rectangular (not shown), etc. While two dice is the preferred means of generating numbers, the inventive game could include a single die, but the variations of play would be severely limited. Similarly, more than two die could be used which would increase the variations of play.

The preferred set of playing dowels 24 includes twelve dowels having number values from one to twelve as designated by the reference numerals as follows: the "one dowel" 1, the "two dowel" 2, the "three dowel" 3, the "four dowel" 4, the "five dowel" 5, the "six dowel" 6, the "seven dowel" 7, the "eight dowel" 8, the "nine dowel" 9, the "ten dowel" 10, the "eleven dowel" 11, the "twelve dowel" 12.

With reference to FIGS. 1-22, the preferred configuration of the game board 22 is shown. The preferred game board 22 includes a plurality of pegs 28 attached to and extending vertically above the playing surface 30. The pegs are aligned in rows 32 and 34. The game board 22 also includes a segmented addition slot 36, a segmented subtraction slot 38, and a plurality of pairs of dice receiving spaces 40.

The pegs 28, right side segments 42 and 44 of the addition slot 36 and subtraction slot 38, respectively, and a pair of the dice receiving spaces 40 are axially positioned along a common line 50 with the numerical indicia 46 for ease of play as will become apparent after consideration of the MODE OF OPERATION (i.e., the method of play) described below. The pair of dice receiving spaces 40 is aligned with the right side of each segment 42 of the addition slot 36 and each segment 44 of the subtraction slot 38 to enable the player to perform and carry out mathematical operations. Numerical indicia 46 denotes which of the pegs 28, of rows 32 and 34, on which a correspondingly valued playing dowel 48 is positioned during play.

MODE OF OPERATION

The inventive game is preferably played according to the following rules. The rules set forth herein should not be construed as limiting as they are provided solely for illustration of the utility of the apparatus and support for the claims appended hereto.

A first player rolls the dice 26 and adds the numerical value of the two die together or counts the numbers of dots on the top face of the dice depending on the age and ability of the player. The dice 26 are then moved to the "EQUALS TO" area 52, where the dice receiving spaces 40 are situated, and placed in a pair of dice receiving spaces 40 corresponding to the numerical sum of the die and the corresponding numerical indicia 46 on the game board 20.

On the first roll of the dice, the numbered dowel 1-12 that matches the sum of the dice is moved from the starting row, which is either row 32 or row 34. In the preferred embodiment, the dowel is moved from the front row 34 to the back row 32. When any dowel reside in the front row 34 it is considered to be "IN PLAY" and when in the back row 32 it is considered to be "OUT OF PLAY".

A subsequent roll of the dice by the same player will present two different possibilities. That is, the numbered dowel 1-12 that matches the total rolled on the dice 26 will either be on the front row of pegs 34 (IN PLAY) or on the back row of pegs 32 (OUT OF PLAY). If the dowel is IN PLAY on the from row 34, then that dowel must be moved to the back row 32 and OUT OF PLAY. If the dowel is on the back row 32, then the remaining dowels of the set 1-12 in play on the front row 34 must be used to complete the players move. That is, two of the remaining dowels IN PLAY can be added or subtracted to equal the sum of the dice rolled.

If the game is played by a single player, the player continues to roll until all of the dowels 1-12 are positioned on the back row 32, at which time the game is said to be over. If the game is being played by two or more players, the first player to move all of his or her dowels 1-12 to the back row 32 is declared the winner.

In an alternate method of play, each player is given only one series of rolls of the dice and his or her portion of the game is over when her or she can no longer move a dowel 1-12 IN PLAY to the OUT OF PLAY position. The next player then is given a series of rolls until he or she cannot move a dowel from the IN PLAY position to the OUT OF PLAY position. When this occurs, and all players have completed their series of rolls, each player adds the values of all of the numbered dowels remaining on the front row 34 which are still IN PLAY. The player with the lowest total is declared the winner. Since younger children usually cannot add, the remaining numbered dowels 1-12 can be stacked or laid down end to end, such that the player with the shortest cumulative length of dowels 1-12 is declared the winner.

Figure 1:
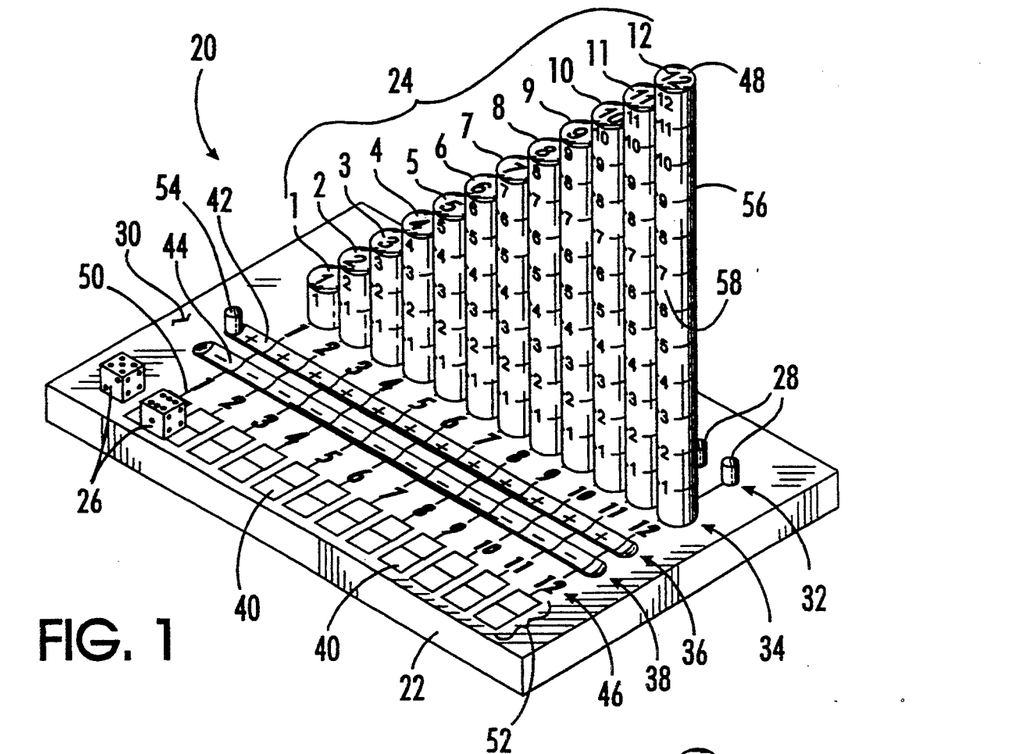
FIG. 1 is an elevated perspective view of the inventive game apparatus showing the initial setup of the playing dowels and dice positioned on the game board.
Figure 2:
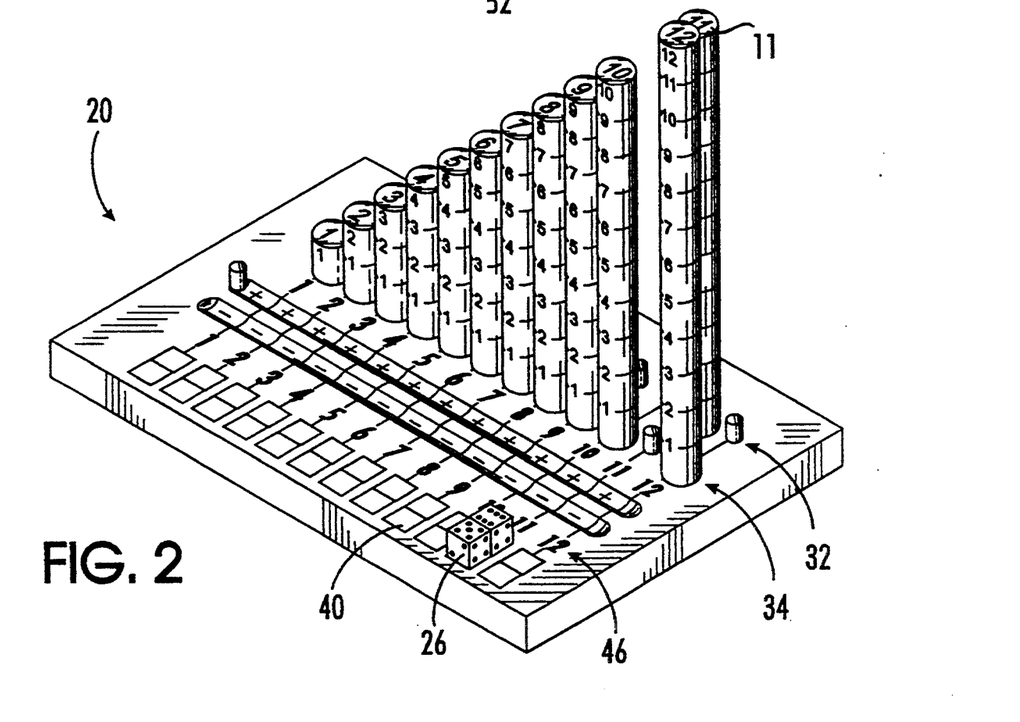
FIG. 2 is an elevated perspective view of the inventive game shown in FIG. 1 with the dice moved to a position on the game board corresponding to the number shown on the dice, and the corresponding dowel moved to the "out of play" (back row) positions.

With reference to FIGS. 1 and 2 of the drawings, a six and a five of the dice 26 is rolled. The dice are placed in the dice receiving spaces 40 corresponding to the numerical indicia 46 that equals the roll of the dice 26 which is an eleven. The eleven dowel 11 is then moved from the front row 34 to the back row 32. The eleven dowel 11 is no longer "in play" and the first move is now complete.

Figure 3:
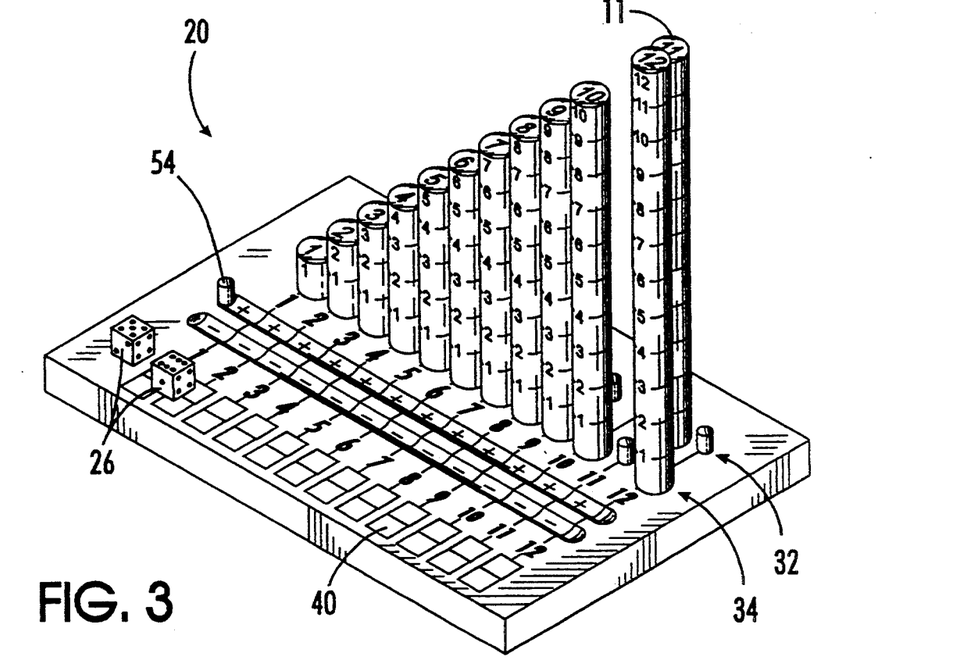
FIG. 3 is an elevated perspective view of the inventive game shown in FIGS. 1-2 at the beginning of a representative second move with a corresponding second roll of the dice.
Figure 4:
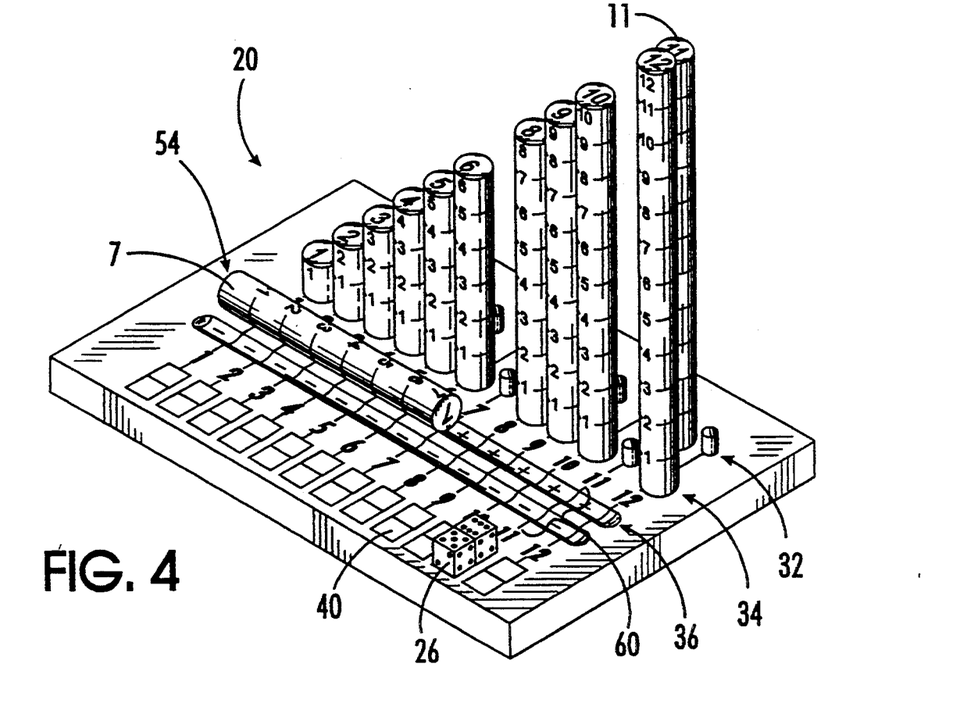
FIG. 4 is an elevated perspective view of the inventive game shown in FIGS. 1-3 with the dice of FIG. 3 shown moved to a position on the game board corresponding to the number shown on the dice and then and arbitrary playing dowel positioned horizontally on the game board.

With reference to FIGS. 3 and 4, another eleven is rolled, and the dice 26 are once again positioned in the dice receiving spaces 40 corresponding to the number eleven. Since the eleven dowel 11 is not IN PLAY, or is said to be OUT OF PLAY, the player must either add or subtract the numerical values of the remaining dowels 1-10 and 12 equal to the number eleven. Since younger children usually cannot add, the game board 22 serves as an addition and subtraction "machine". By allowing the dowels 1–12 to be placed in the addition slot 36 and/or subtraction slot 38 such that the summation or difference of any two or more dowels can be visually seen on the common line 50 and numerical indicia 46. FIGS. 4 through 22 illustrate the game board 22 can be used as an addition and subtraction machine.

Figure 5:
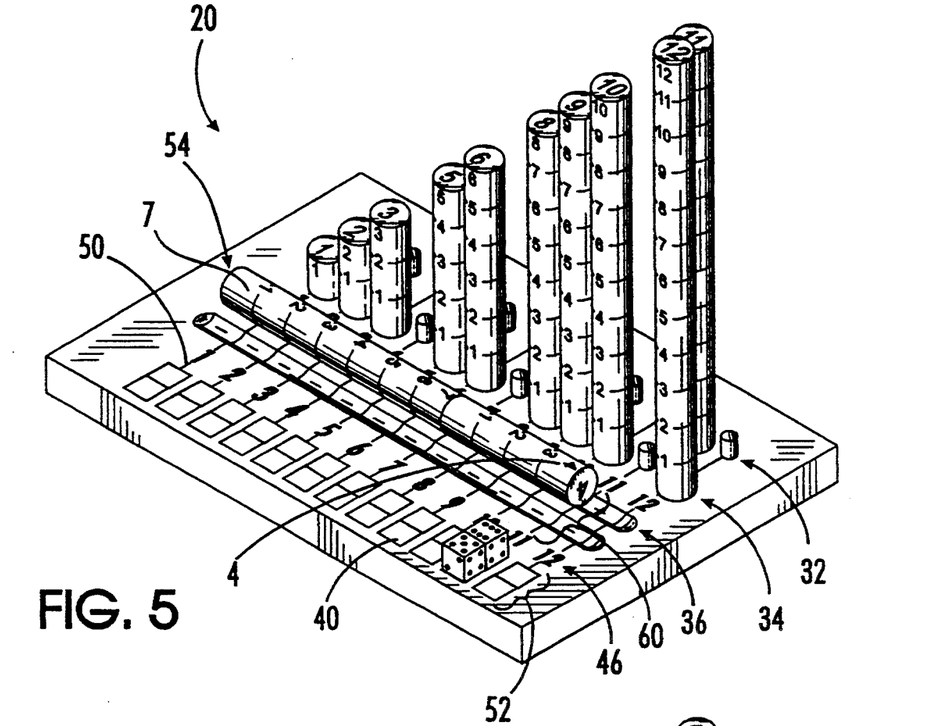
FIG. 5 is an elevated perspective view of the inventive game of FIGS. 1-4 shown with a plurality of playing dowels in the addition alignment with another playing dowel positioned adjacent the dowel shown in FIG. 4 that corresponds to the roll of the dice.
Figure 6:
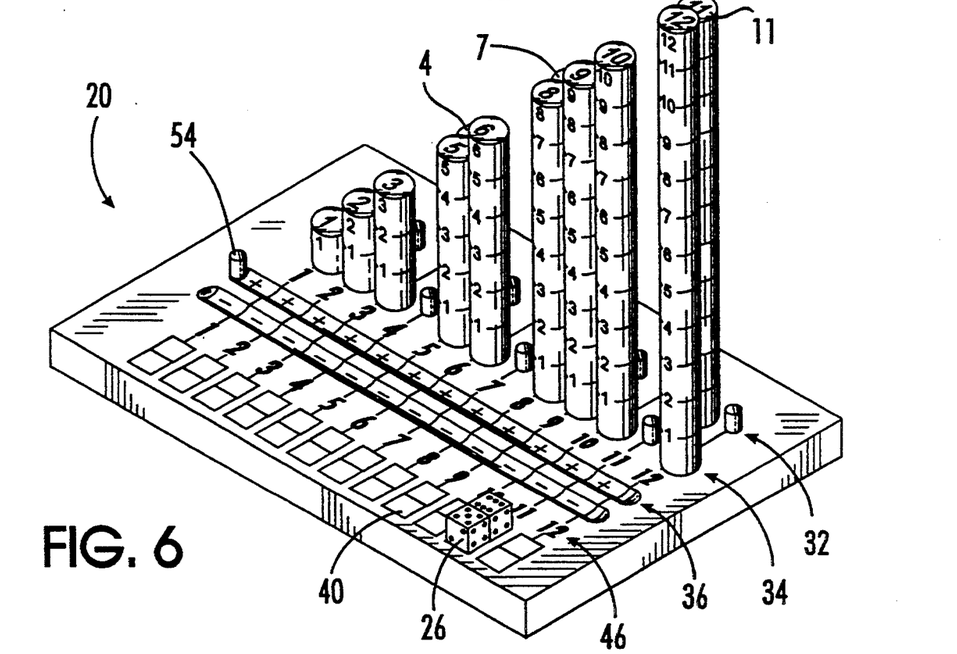
FIG. 6 is an elevated perspective view of the inventive game of FIGS. 1-5 shown with the horizontal playing dowels of FIG. 5 repositioned on the game board vertically to the "out of play" (back row) position.
Figure 17:
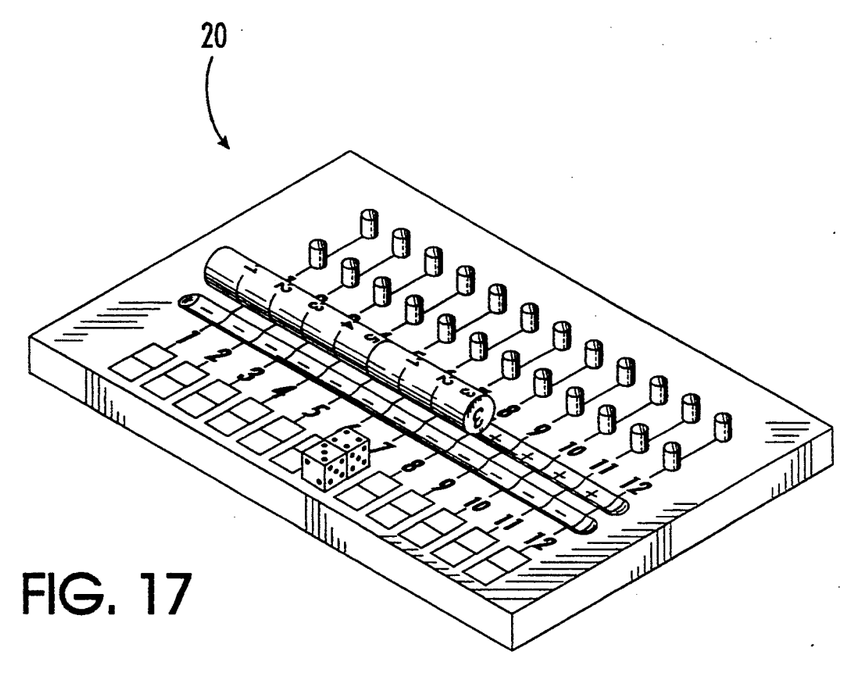
FIG. 17, 18, 19, 20, 21 and 22 are elevated perspective views of the inventive game with some of the playing dowels removed from the game board to illustrate the self-correcting nature of the inventive game.
Figure 18:
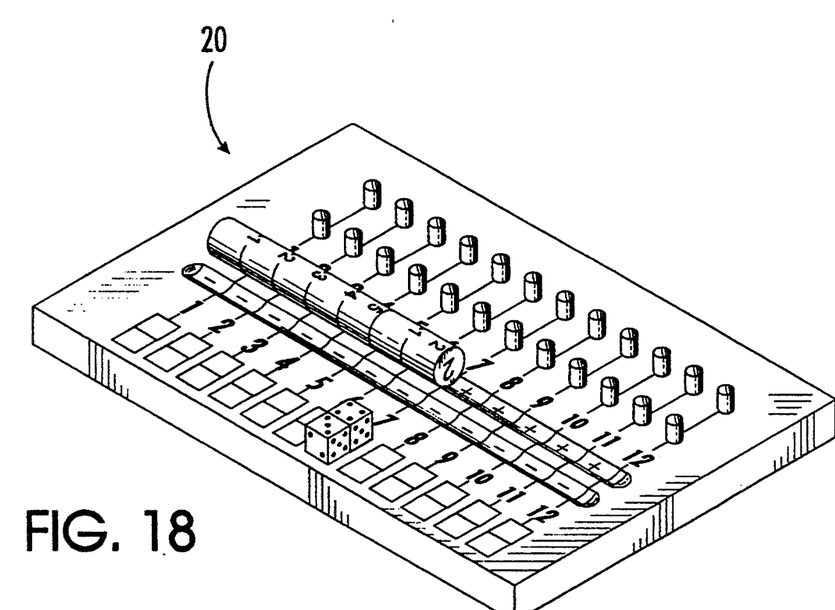

With reference to FIGS. 4–6, the seven dowel 7 is arbitrarily chosen and is moved from the from row 34 and positioned in the addition slot 36 with the left end of the dowel against the stop 54. Another dowel from the remaining group 1–6, 8–10 and 12 must be chosen to get to the eleven line on the board. In this example, the four dowel 4 is moved from the front row 34 and positioned in the addition slot 36 with its left side abutting the seven dowel 7. The total length of the seven dowel 7 and four dowel 4 lines up with common line 50 at the eleven line 60 location of the game board 20. If the player selects the wrong combination of dowels the cumulative length (in this addition example) will not line up with the correct common line 56 on the board 20. This situation, and the self correcting nature of the game board, is shown in FIG. 17 and 18. When the correct combination is decided upon (FIG. 5), the four dowel 4 and the seven dowel 7 are moved to the back row 32 and out of play (FIG. 6). The second move is now complete.

Figure 7:
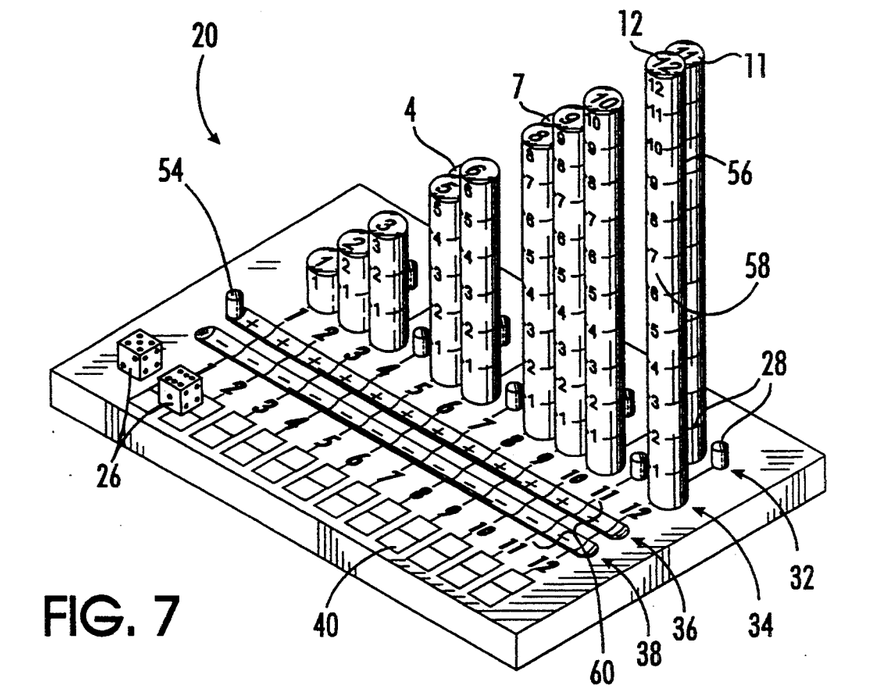
FIG. 7 is an elevated perspective view of the inventive game of FIGS. 1-6 shown at the beginning of a representative third move and with yet another roll of the dice (the same number of the dice roll is selected for illustration purposes only as it is believed to facilitate an understanding of the various permutations of the game and method of play)
Figure 8:
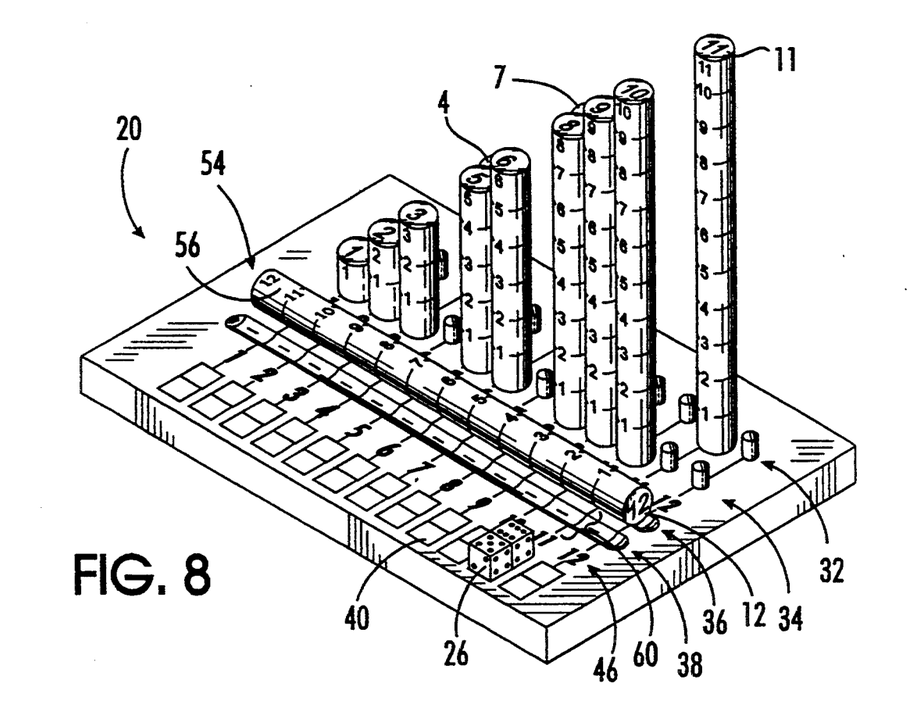
FIG. 8 is an elevated perspective view of the inventive game of FIGS. 1-7 shown with the dice moved to a position on the game board corresponding to the number shown on the dice and with a playing dowel shown horizontally on the game board.

With reference to FIG. 7 and 8, another eleven has been rolled 26. Since the eleven dowel 11, four dowel 4 and seven dowel 7, are not IN PLAY, one must try to add or subtract numbers to equal eleven. If the player selects the twelve dowel 12 and it is moved from the front row 34 and positioned in the addition slot 36 with its left end against the stop 54, another dowel must be chosen to get the overall length back to the eleven line 60 on the board 20. Recall, the dowels can be placed end to end, or side by side, for counting purposes. It is important to note, the twelve dowel 12 of FIG. 8 is positioned such that it has a subtraction side 56 opposite the addition side 58 (compare to FIG. 11) facing up. The subtraction and addition sides 56 and 58 of the dowels 1–12 allow the player to visually identify and understand what number is required to get back to the eleven line 60 on the board.

Figure 9:
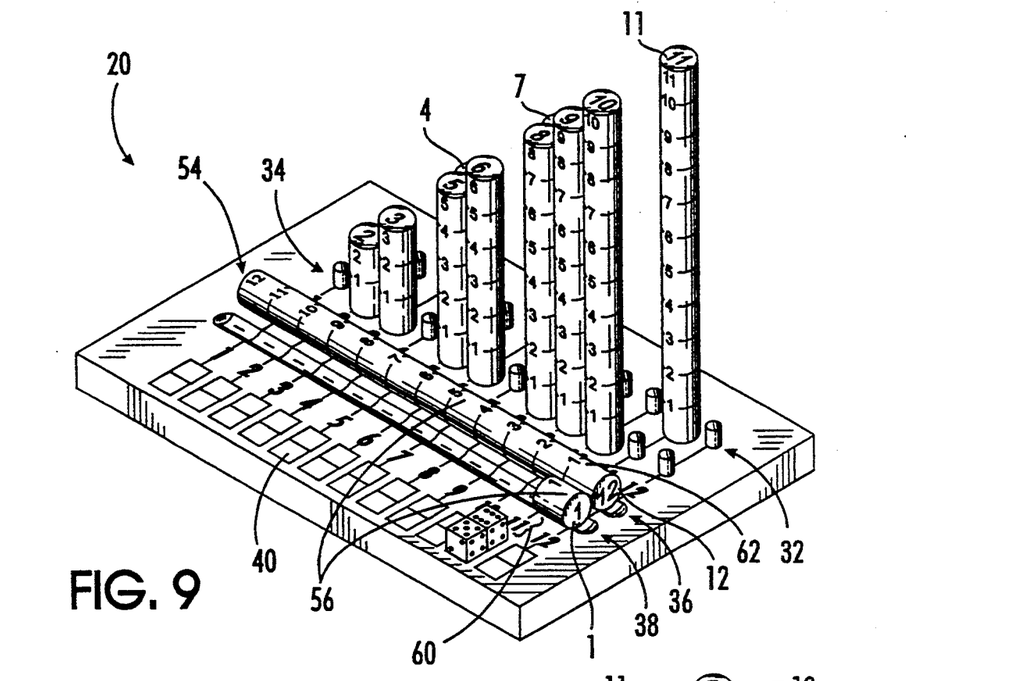
FIG. 9 is an elevated perspective view of the inventive game of FIGS. 1-8 shown in the subtraction alignment with a plurality of playing dowels placed horizontally on the game board.
Figure 10:
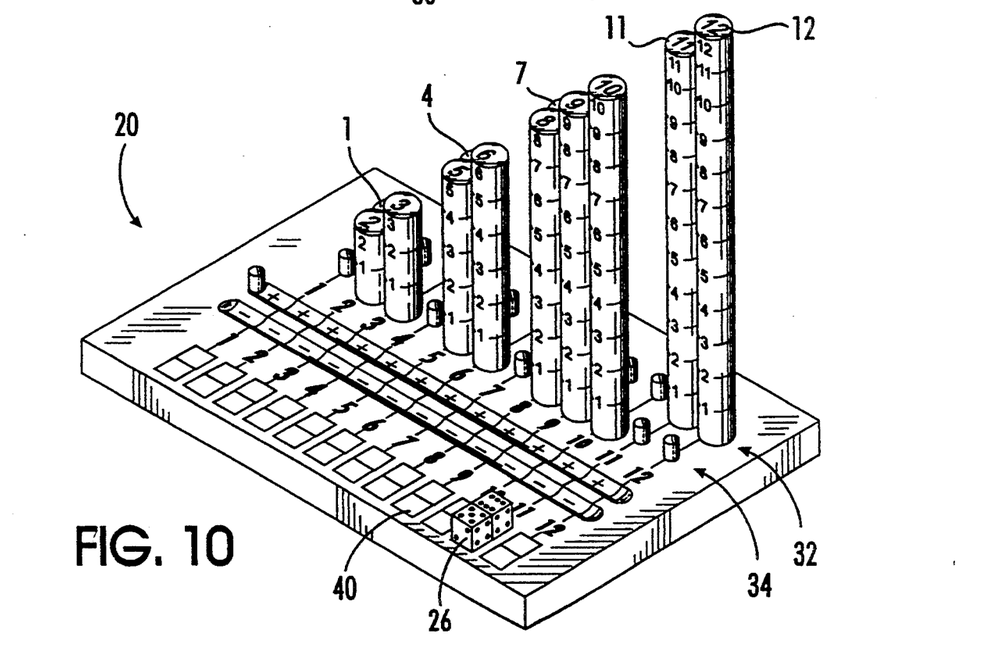
FIG. 10 is an elevated perspective view of the inventive game of FIGS. 1-9 shown with the dowels of FIG. 9 repositioned vertically on the game board to the "out of play" (back row) position.
Figure 11:
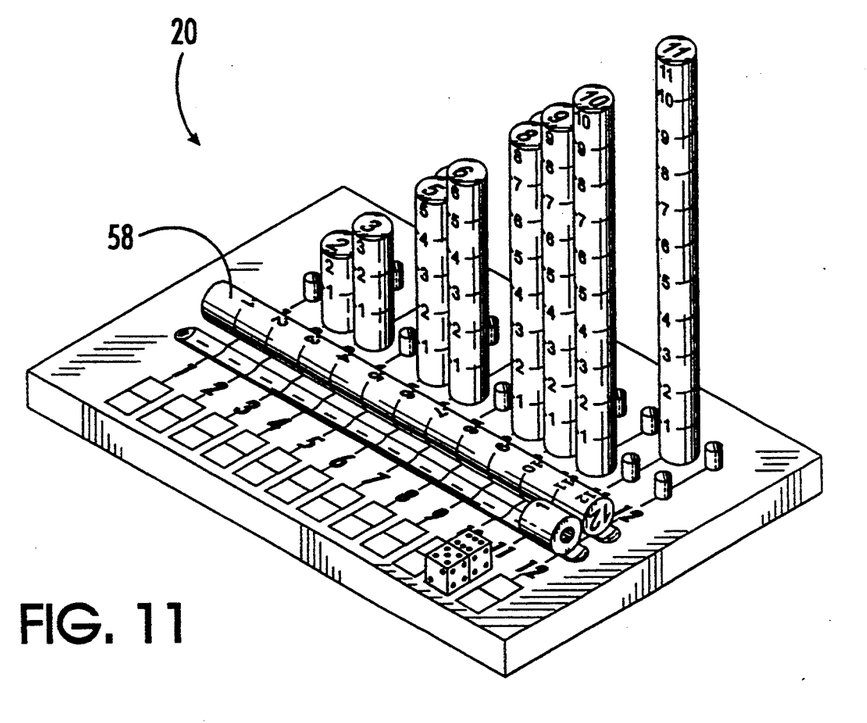
FIG. 11 is an elevated perspective view of the inventive game of FIGS. 1-10 shown with the addition side of a plurality of playing dowels face up, and is provided to illustrate an example of the plurality of arrangements the playing dowels may be positioned on the game board.
Figure 12:
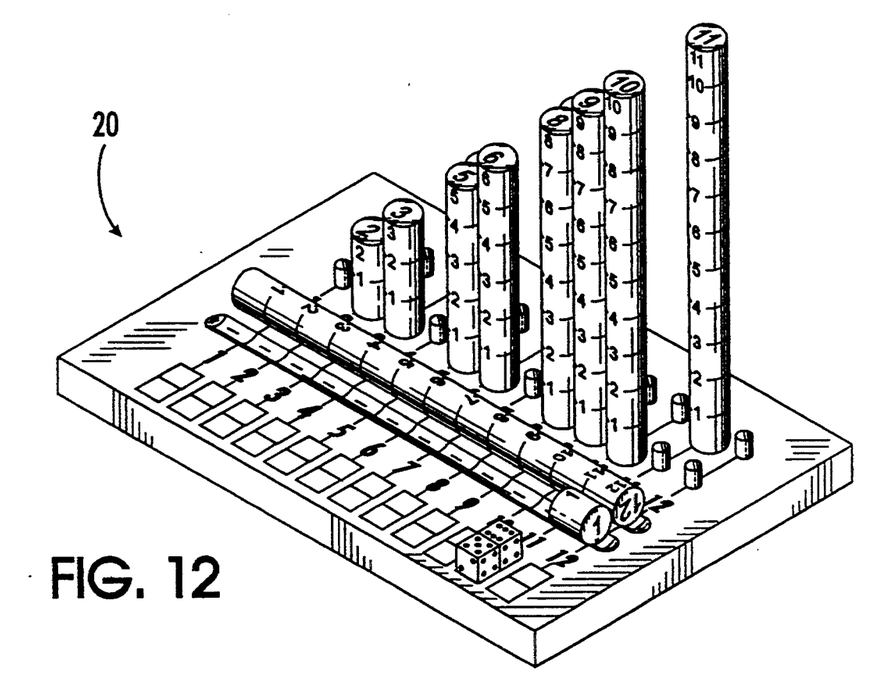
FIG. 12 is an elevated perspective view of the inventive game of FIGS. 1-11 shown with one of the playing dowels with the addition side face up and another of the playing dowels with the subtraction side face up, and is provided as an alternative to the arrangement of the dowels shown in FIG. 11.
Figure 19:
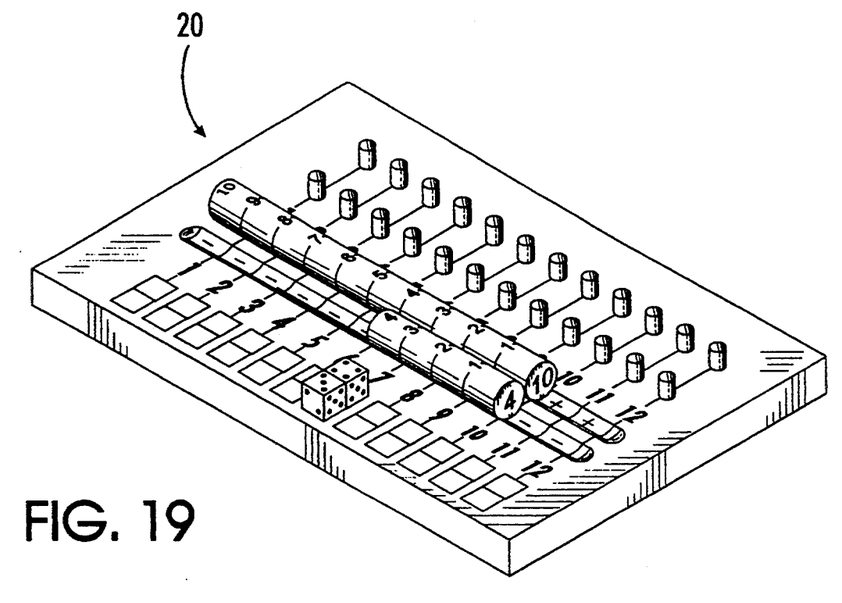
Figure 20:
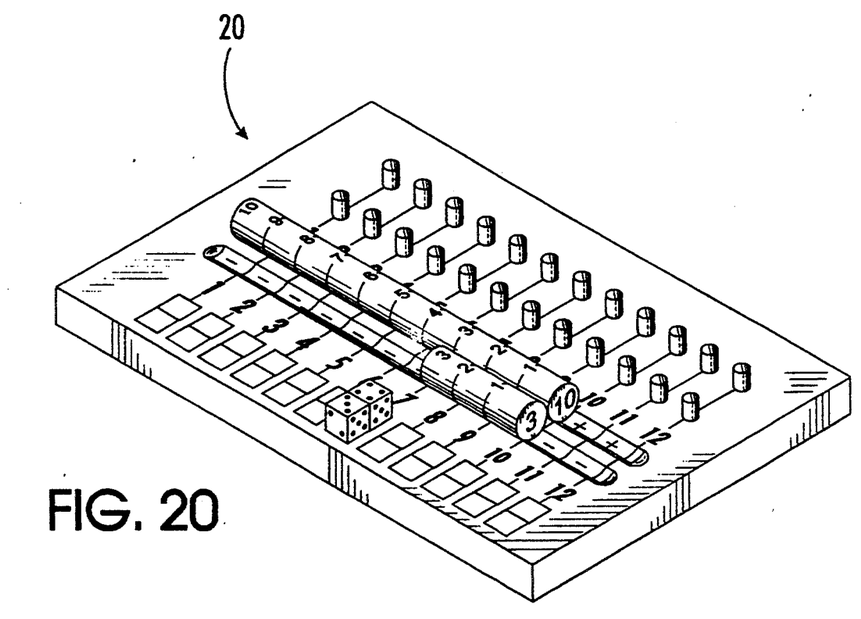
Figure 21:
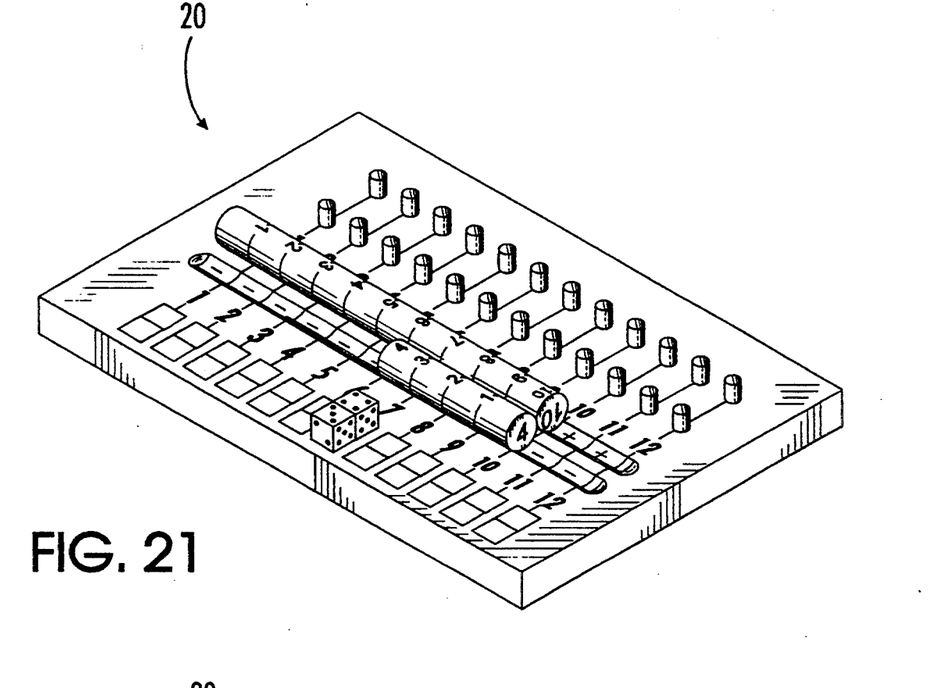
Figure 22:
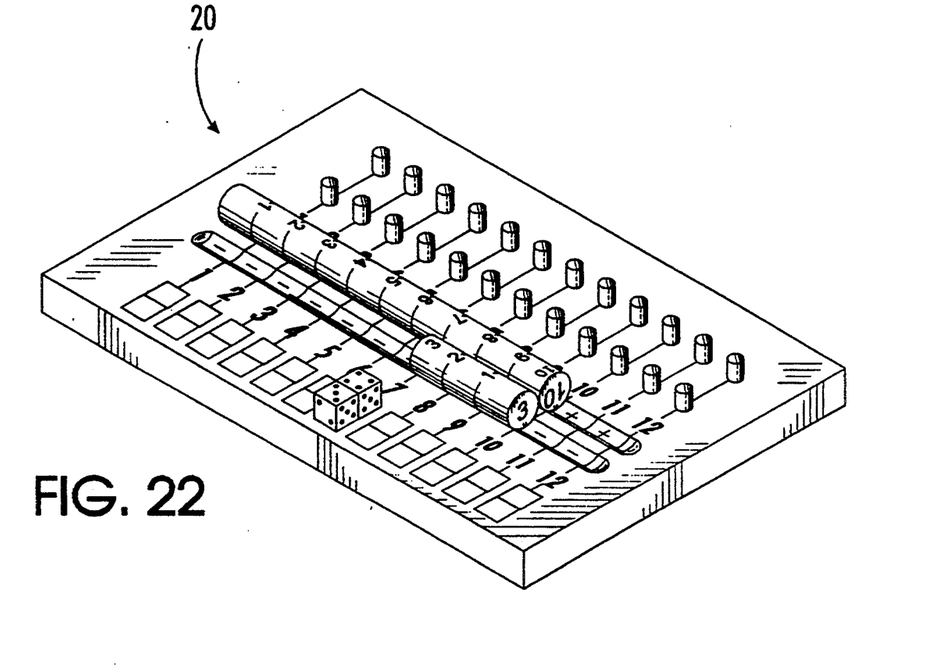
Figure 23:
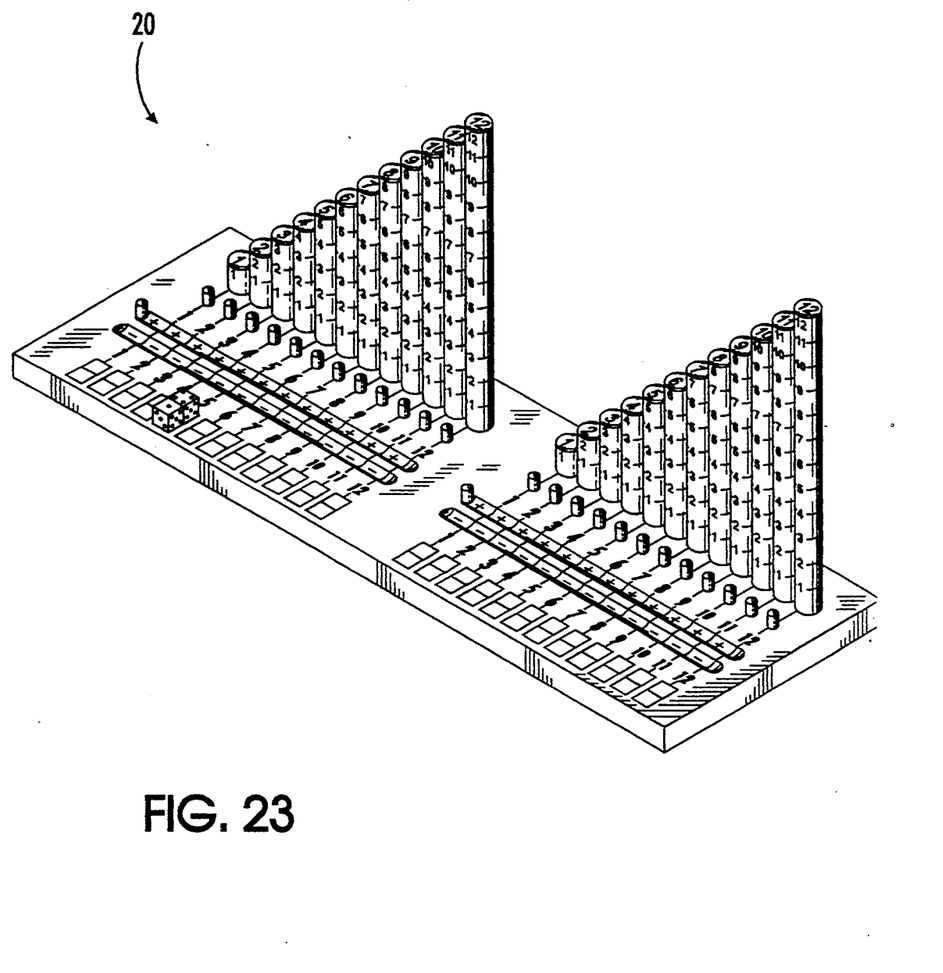
FIG. 23 is an elevated perspective view of an alternate embodiment of the inventive game designed for two person play.
Figure 24:
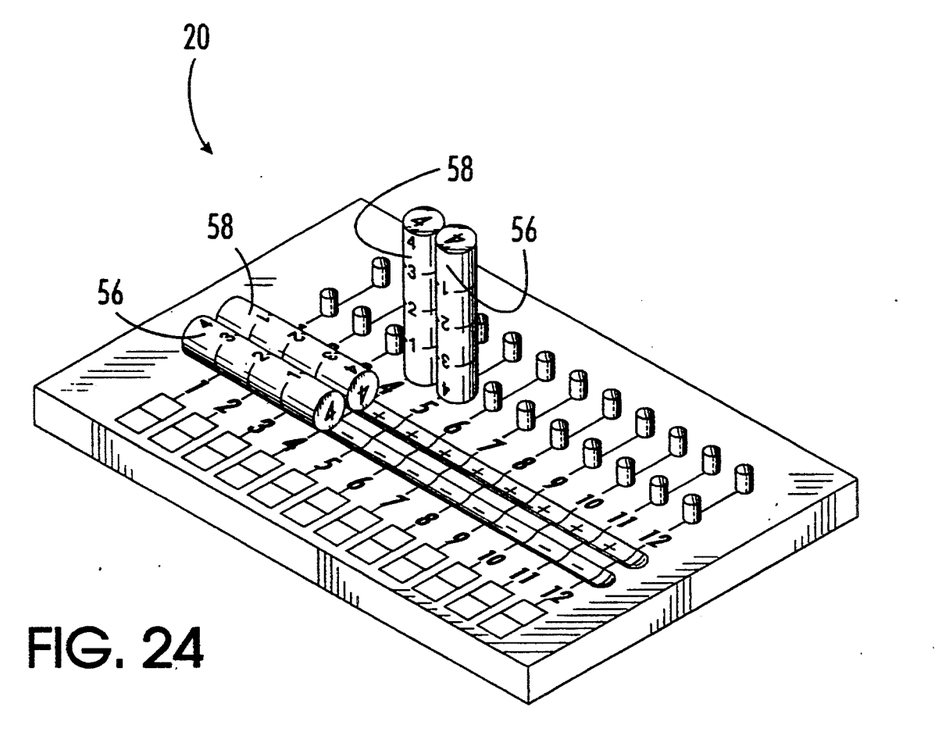
FIG. 24 is an elevated perspective view of the "Four Dowel" shown in a side-by-side comparison of the addition and subtraction sides of the dowel.
Figure 25:
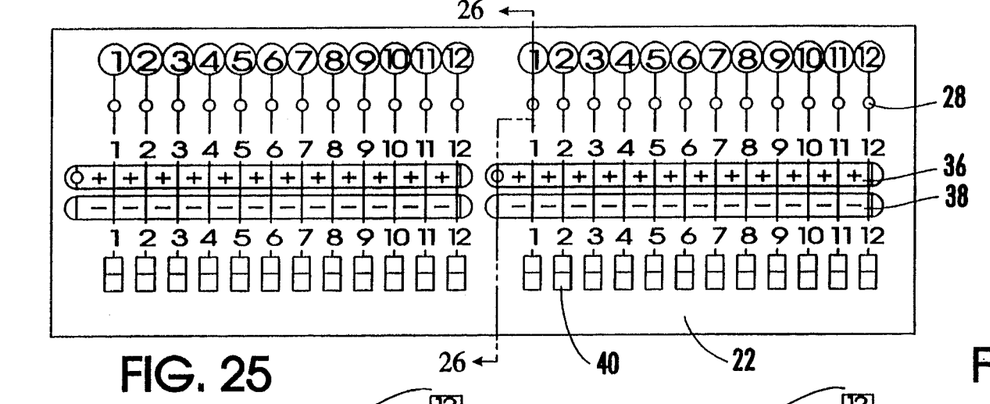
FIG. 25 is a top view of the two player embodiment of the inventive game with the playing dowels positioned on the game board.
Figure 26:
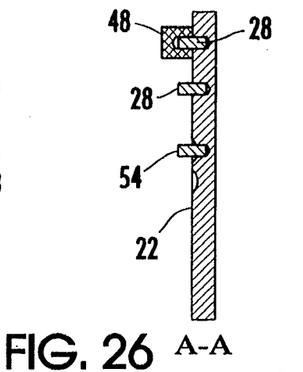
FIG. 26 is a cross-sectional view of the inventive game taken along line A—A of FIG. 25.
Figure 27:
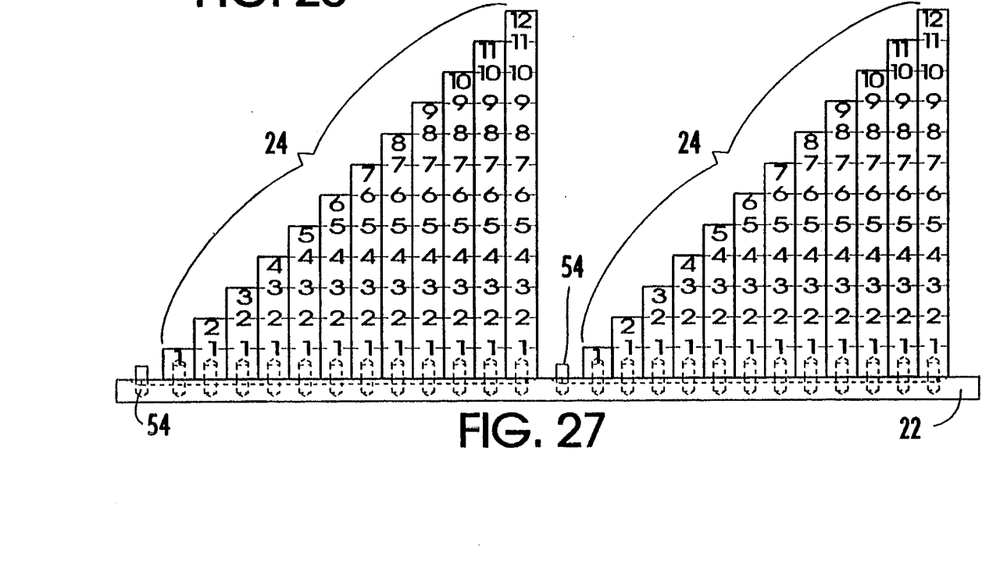
FIG. 27 is a front view of the inventive game of FIG. 25.
Figure 28:
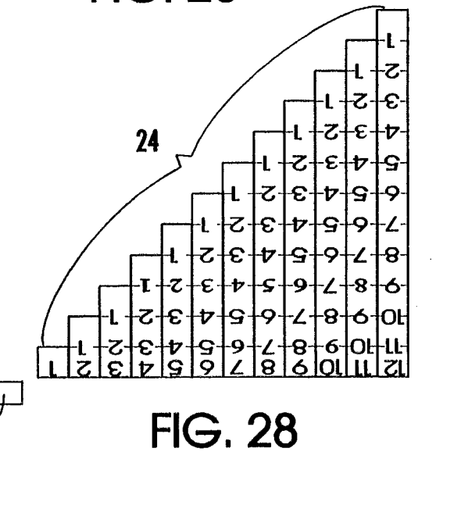
FIG. 28 is a front view of a plurality of playing dowels placed side by side to illustrate the relative heights corresponding to the associated numbers values of each dowel with the subtraction side facing forward.

With reference to FIGS. 9 and 10, the number one 62 on the subtraction side 56 of the twelve dowel 12 is lined up with the eleven 60 line on the board 20. A small child would typically not realize this relationship but would only see that a small dowel is required to get back to the eleven line 60. FIG. 9 shows the one dowel 1 moved from the front row 34 and positioned in the subtraction slot 38 with the right side of the one dowel 1 lined up with the right side of the twelve dowel 12. Note that the one dowel 1 is positioned with the subtraction side 56 face up. The one dowel 1 is subtracted from the twelve dowel 12 to make eleven. If the wrong dowel is chosen at this point, the combination of the two dowels will not line up with the correct line on the board (this situation and self correcting nature of the game board 20 is shown in FIGS. 18 and 19. In Figure 10 the twelve dowel 12 and the one dowel 1 are moved to the back row 32 to accompany the eleven dowel 11, seven dowel 7 and four dowel 4, and are no longer IN PLAY. The third move is now complete.

Figure 13:
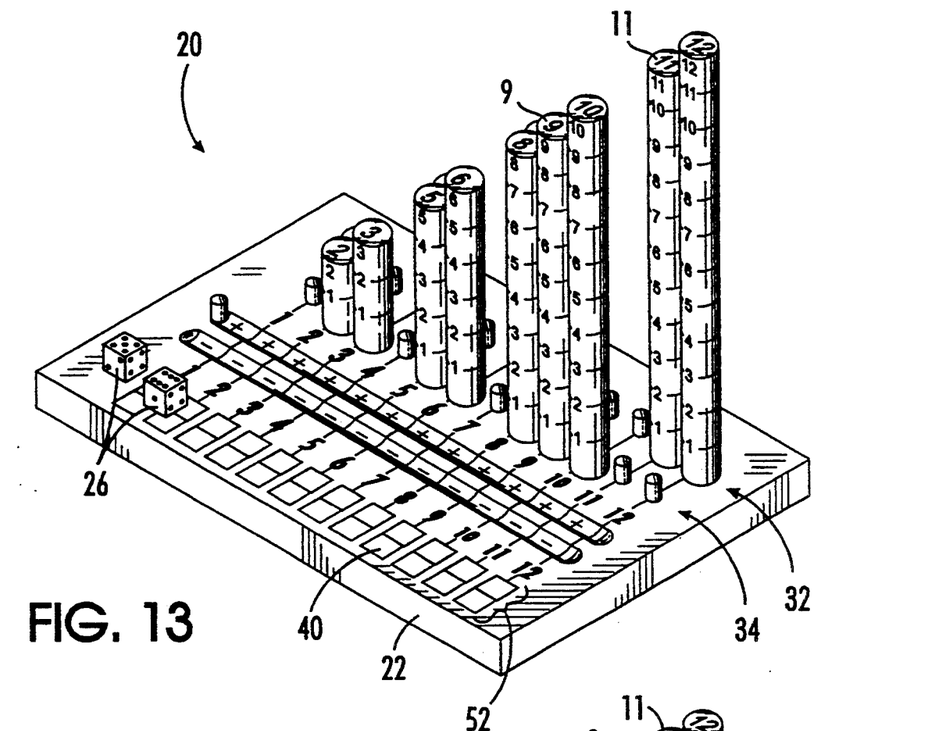
FIG. 13 is an elevated perspective view of the inventive game of FIGS. 1-12 shown at the beginning of representative fourth move.
Figure 14:
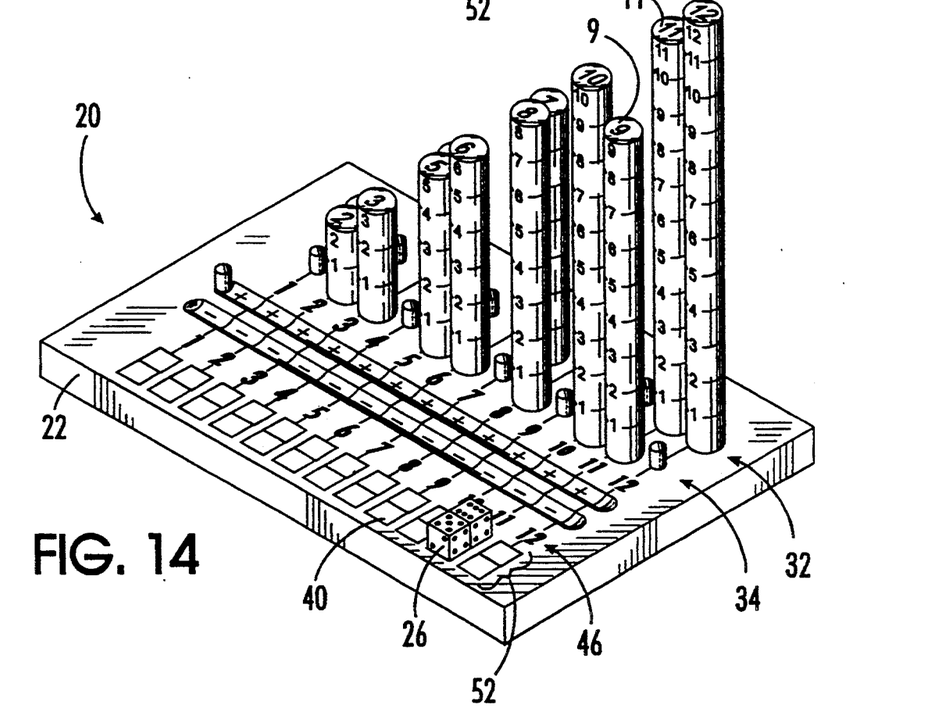
FIG. 14 is an elevated perspective view of the inventive game of FIGS. 1-13 shown with the dice moved to a position on the game board corresponding to the number shown on the dice and then an arbitrary dowel (nine dowel) repositioned vertically in front of the dowel that corresponds to the "roll of the dice"
Figure 15:
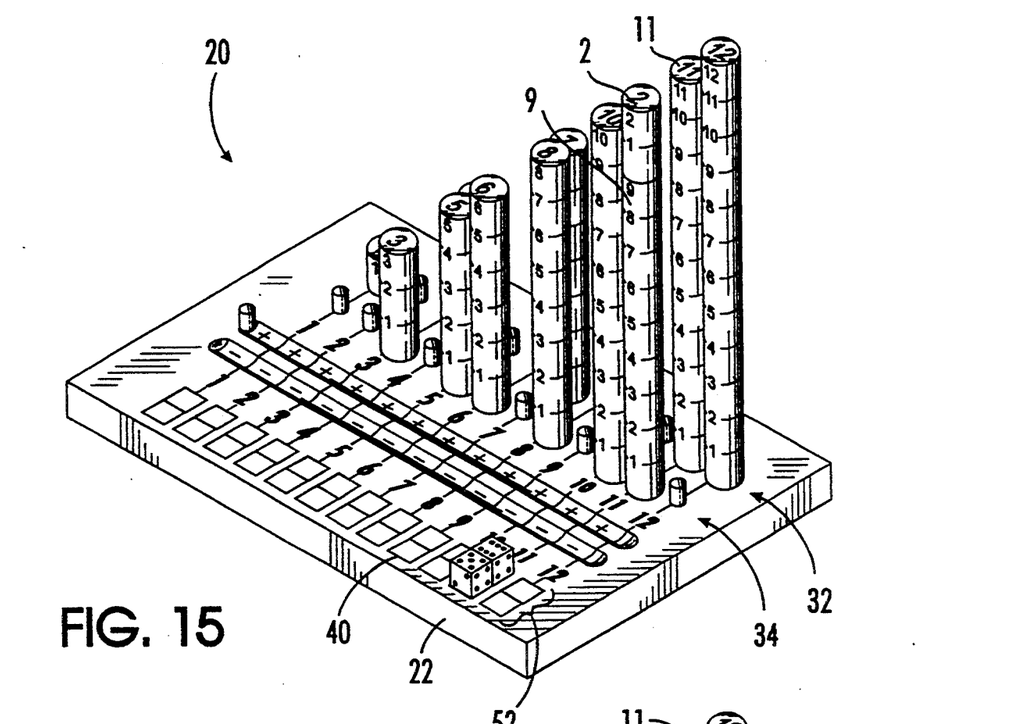
FIG. 15 is an elevated perspective view of the inventive game of FIGS. 1-14 shown the "Two Dowel" moved from its position on the front row to the top of the "Nine Dowel" in a stacked arrangement.
Figure 16:
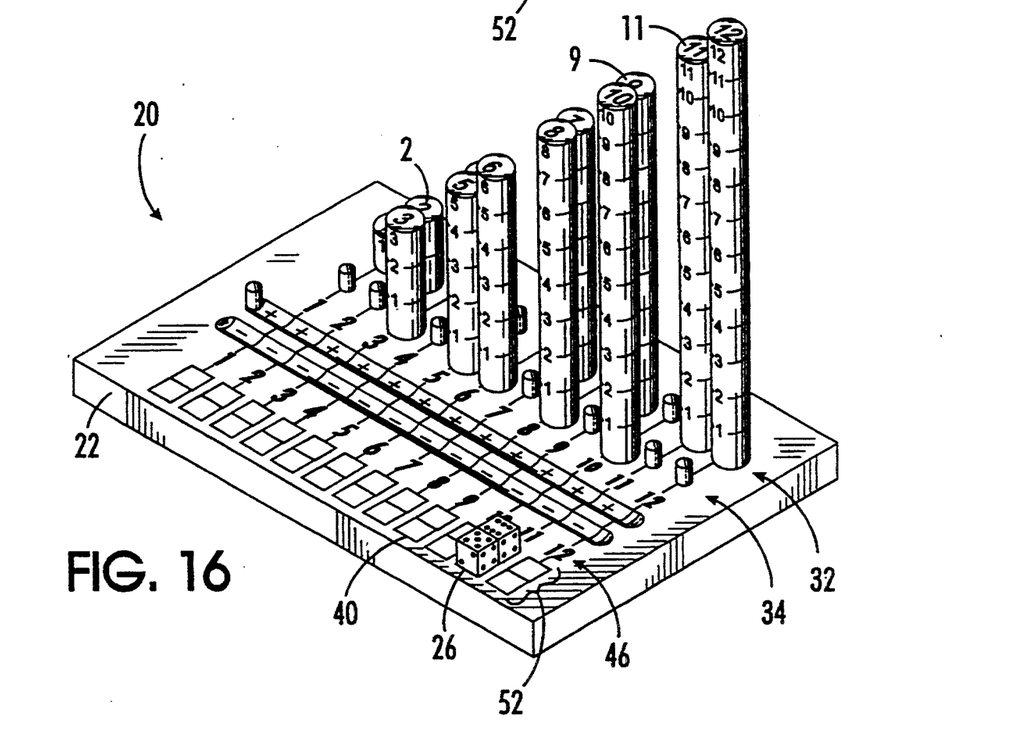
FIG. 16 is an elevated perspective view of the inventive game of FIGS. 1-15 shown with the specified playing dowels of FIG. 15 moved to the back row of the game board.

With reference to FIGS. 13 and 14 yet another eleven is rolled and the dice 26 are placed in front of the eleven in the "equals to" 52 dice receiving spaces 40 area of the board 22. In this portion of the example, the player chooses the nine dowel 9 from the front row 34 and moves it to front row 34 of the eleven dowel position to better illustrate the stacking nature of the game mentioned above. With the nine dowel 9 in front of the OUT OF PLAY eleven dowel 11, multiple dowels can now be stacked. That is, the player may choose another dowel, place it on top of the nine dowel 9 to compare the cumulative height of the combination to the eleven dowel 11. FIG. 15 illustrates this stacking capability of the inventive game apparatus by showing the two dowel 2 on top of the nine dowel 9 to equal the height of the eleven dowel 11. FIG. 16 then shows both the two and the nine dowel 9 move to the OUT OF PLAY position.

Play would continue until the roll of a subsequent roll of the dice could not be matched by any of the dowels or combination of dowels on the front row 34 that are still in play. In a two player game, the player with the lowest cumulative total of the dowel values remaining on the front row is declared the winner. For a younger player that is not proficient at addition, the dowels on the front row could be stacked or laid down end to end in the manner described above.

What is claimed is:

1. A game for teaching addition and subtraction, comprising:
    a plurality of dowels having predetermined lengths comprised of a least one unit, wherein the length of any of the plurality of dowels can be determined by a number N corresponding to the sum of the number of units associated with a particular dowel of the plurality of dowels;
    a game board having a plurality of spaced apart rows capable of receiving any of the plurality of dowels in a vertical or a horizontal position;
    number generating means for generating at least one number; and
    at least one row divided in incremental segments wherein each segment has a length corresponding to a single unit and indicia denoting a mathematical operation to be carried out in such row wherein the mathematical operation is addition or subtraction.

2. The game of claim 1, wherein the plurality of rows further comprises:
    at least one row having spaced apart dowel receiving means for receiving any of the plurality of dowels and supporting them in a vertical position.

3. The game of claim 3, wherein:
    the at least one row includes a pair of spaced apart rows.

4. The game of claim 2, wherein the dowel receiving means further includes: at least one peg.

5. The game of claim 1, wherein the game board further includes:
    indicia denoting the number of units N.

6. The game of claim 1, wherein the at least one row further includes: comprises:
    a slot for receiving any of the plurality of dowels in a horizontal position.

7. The game of claim 1, wherein the plurality of dowels further includes:
    numerical indicia corresponding to the number N of units comprising the length of a particular dowel.

8. A method of teaching addition and subtraction, comprising the steps of:
    positioning a plurality of dowels at a starting position of a game board having a plurality of rows wherein at least one row is divided in incremental segments wherein each segment has a length corresponding to a single unit and indicia denoting a mathematical operation to be carried out in such row wherein the mathematical operation is addition or subtraction, the plurality of dowels further have predetermined lengths comprised of a least one unit, wherein the length of any of the plurality of dowels can be determined by a number N corresponding to the sum of the number of units associated with a particular dowel of the plurality of dowels; generating a number N; and selecting at least one dowel corresponding to the number N and moving it from its starting position to a second position.

9. The method of claim 8, wherein the step of generating a number N further includes the step of:

rolling a pair of dice and adding the result to obtain the number N.

10. The method of claim 8, wherein the selecting at least one dowel corresponding to the number N further comprises the step of:

selecting a plurality of dowels whose cumulative sum of units correspond to the number N and moving the dowels selected to a second position.

11. The method of claim 10, wherein the step of selecting a plurality of dowels further includes the step of:

aligning the dowels selected in an end to end fashion on the game board to verify if the cumulative sum of the units of the dowels selected correspond to the number N.

12. The method of claim 11, wherein:

the alignment of dowels in an end to end fashion is done vertically upright or horizontally lying them down on the game board.

13. The method of claim 10, wherein the step of selecting a plurality of dowels further includes the step of:

aligning the dowels selected side by side in a parallel arrangement to verify if the difference between the number of units of the plurality of selected dowels corresponds to the number N.

14. A game for teaching addition and subtraction, comprising:

a set of dowels having lengths comprised of a least one unit, wherein the length of any of the dowels in the set can be determined by a number N corresponding to the sum of the number of units associated with a particular dowel of the set; and a game board comprising: a plurality of spaced apart rows capable of receiving any of the set of dowels in a vertical or a horizontal position, and at least one row divided in incremental segments wherein each segment has a length corresponding to a unit and indicia denoting a mathematical operation to be carried out in such row wherein the mathematical operation is addition or subtraction.

15. The game of claim 14, wherein the plurality of rows further comprises:

at least one row having spaced apart dowel receiving means for receiving any of the plurality of dowels and supporting them in a vertical position.

16. The game of claim 15, wherein:

the at least one row includes a pair of spaced apart rows.

17. The game of claim 15, wherein the at least one row further includes: comprises:

a slot for receiving any of the plurality of dowels in a horizontal position.

18. The game of claim 15, wherein the dowel receiving means further includes: at least one peg.

19. The game of claim 14, wherein the game board further includes:

indicia denoting a the number of units N.

20. The game of claim 14, wherein the plurality of dowels further includes:

numerical indicia corresponding to the number N of units comprising the length of a particular dowel.

* * * * *